INVENTOR.
ANTHONY J. HORNFECK

Patented June 19, 1951

2,557,742

UNITED STATES PATENT OFFICE 2,557,742

ELECTRIC TELEMETERING CONTROL CIRCUITS

Anthony J. Hornfeck, Lyndhurst, Ohio, assignor to Bailey Meter Company, a corporation of Delaware Application September 10, 1948, Serial No. 48,602

21 Claims. (Cl. 318—28)

My invention relates to electrical control circuits and particularly to circuits and apparatus arranged to provide an electrical output continually representative of a quantity, quality, position or the like which may be manifested as a force, position or value. The electrical output may be of amplified value and useful in any desired manner such for example as in the speed regulation of a motor or similar power means. The motor in turn may be arranged to control the value of a variable which may effect the original force or value. Thus the input to my improved circuit may be representative of the value of a variable condition, while the output of the circuit may regulate the variable condition to tend to maintain it at a predetermined value. On the other hand the regulation or result achieved by the electrical output may have no relation to, nor have any effect upon, the condition which established the electrical input to the circuit. Representative of variable quantities, conditions and the like to which I have referred are such variables as rate of fluid flow, temperature, liquid level, pressure; although the variable may equally as well be the position in space of an object, the throttling position of a valve, the ratio of flows or pressures, or the like.

As a particular embodiment of my invention I have chosen to illustrate and describe a system wherein the position in space of a member is representative of a pressure ratio or relation, for ultimately regulating the speed of a motor affecting the values of the pressures whose ratio is desirably to be maintained. The ratio or relation may be of pressures or of pressure differentials indicative of fluid flow rates. The member establishes an A.-C. signal representative of its position in space and thereby representative of the relation of pressures or a pressure compared to a preselected relation value. By means of the circuit disclosed the A.-C. signal is inverted and power boosted to provide a D.-C. output of amplified power. The output is, in one embodiment, used in controlling a motor for varying one or more of the pressures first mentioned.

Figure 1:
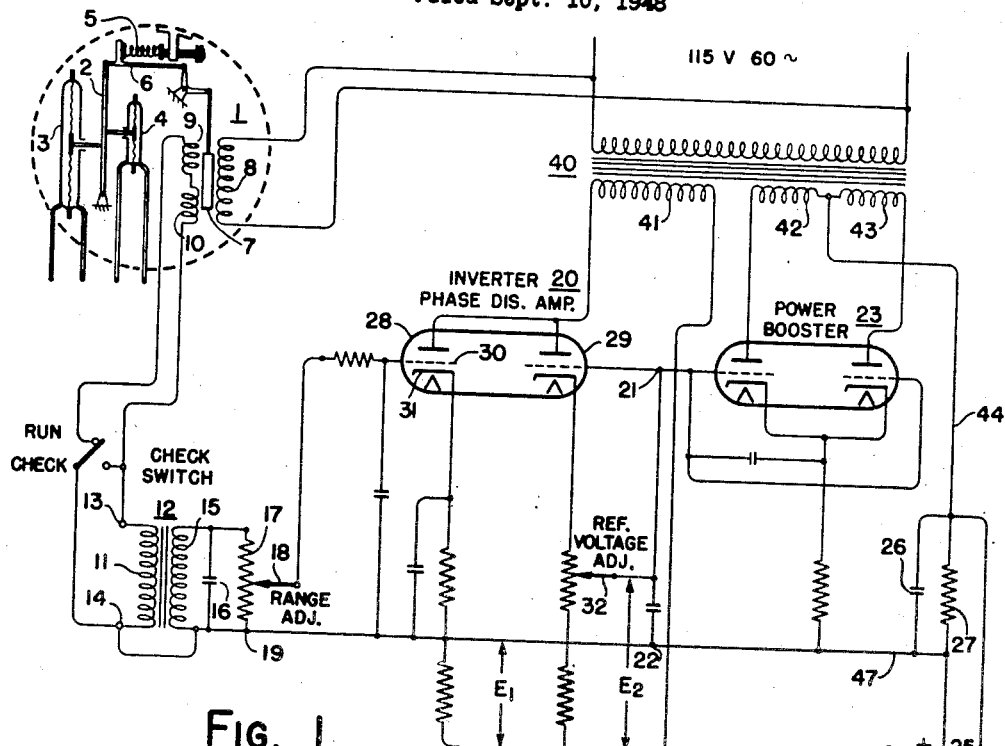
Fig. 1 illustrates in diagrammatic form a preferred embodiment of my circuit.

Referring now to Fig. 1 I show therein a ratio control device 1 in which the mechanism has been shown very diagrammatically. A pivoted beam 2 is acted upon by opposing diaphragms 3 and 4 which may be of the same or different size and may be so located along the beam 2 as to provide any desired ratio of forces acting to position the beam. Angular movement of the beam about its pivot is opposed by a loading spring 5.

Pivotally connected to the beam 2 is a linkage 6 arranged to vertically position the core piece 7 of a movable element transformer having an A.-C. energized primary winding 8 and a pair of bucking secondary windings 9, 10 connected in series across the primary 11 of an insulating transformer 12. The arrangement is such that voltages are induced in the circuit loop 9, 10, 11 by the coupling of energized primary 8 with the secondaries 9, 10 through the agency of core 7. When the core 7 is at its electrical neutral position, corresponding usually with its physical central location relative to windings 8, 9, 10, then zero A.-C. voltage obtains across terminals 13, 14. If the core is moved upwardly from its norm (on the drawing) an increasing A.-C. voltage of one phase obtains across terminals 13, 14 while if the core 7 is moved downwardly from its neutral position or norm an increasing A.-C. voltage of opposite phase obtains across terminals 13, 14. Thus the A.-C. voltage at 13, 14 is of a phase determined by direction of movement of core 7 and of a magnitude determined by extent of core movement. The current at 13, 14 is however very small and is negligible insofar as useful power availability is concerned. The entire mechanism 1 may be referred to as a transducer.

The transformer 12 has a secondary 15 spanned by a condenser 16 and resistor 17, the latter contacted by a manual range adjustment contact arm 18. The arm 18 and terminal 19 join an inverter or phase discriminating amplifier 20 producing at its output terminals 21, 22 a direct current of amplified voltage but still at low current value. The output terminals 21, 22 are in turn the input terminals of a power booster 23 in the form of a grid-controlled full-wave rectifier whose output at terminals 24, 25 is full-wave pulsating D.-C. smoothed out by the filter 26, 27 and of a value determined by the position of core 7 above or below its electrical mid-point.

The inverter or phase discriminating amplifier 20 is shown as a single envelope tube containing triodes 28 and 29; of which triode 29 is a rectifier supplying a reference voltage $E_2$ which is pulsating D.-C. resulting from half-wave rectification of the A.-C. supply. The tube 20 is preferably such as a 6SN7, with grid controlled triodes, having a linear voltage output characteristic about evenly divided across the grid condition of zero impressed voltage. Manually adjustable contact 32 establishes the value of the reference voltage $E_2$ output of triode 29 in desired relation to the value which $E_1$ will have under the condition of zero voltage across terminals 18, 19. In other words, under such condition, $E_2$ may be equal to $E_1$, or may be biased above or below $E_1$ through the agency of adjustable contact 32.

Triode 28 is phase discriminatory as to the voltage across 18, 19 for producing a voltage $E_1$ to be compared to reference voltage $E_2$. Any voltage at 18, 19 is impressed between the grid 30 and cathode 31 of triode 28. When core 7 is in its

| Position of core 7 | A.-C. Voltage Across 13, 14 | Pulsating D.-C., Amplified Voltage, Low Current Across 21, 22 $E_2$-$E_1$ | Full-Wave Rectified Pulsating D.-C., Constant Polarity, Amplified Voltage, Amplified Current Across 24, 25 |
| --- | --- | --- | --- |
| Highest | Phase A Max. Voltage In phase with 28 | $E_1$ increases $E_1$-$E_2$+Polarity | Below 50% Power Max. |
| Mid | Zero Voltage | $E_2$=$E_1$ Zero Voltage | 50% Power Max. |
| Lowest | Phase B Max. Voltage Out of phase with 28 | $E_1$ decreases $E_2$-$E_1$-Polarity | 100% Power Max. | neutral position no voltage exists across 18, 19 but the triode 28 will pass pulsating D.-C. resulting from half-wave rectification of the A.-C. supply. In the present embodiment, I preferably adjust 32 so that $E_2$ is substantially equal to $E_1$ at a condition of zero voltage across 18, 19. This is the condition of greatest stability and allows approximately equal regulation in either direction from zero voltage output across terminals 21, 22.

When core 7 moves in one direction from its neutral an A.-C. voltage appears at 13, 14 and is applied to grid 30 of triode 28. Such voltage is in phase with the plate voltage of triode 28 and gives an increase in plate current and an increase in voltage $E_1$. The difference in voltages $E_1$—$E_2$ appears at 21, 22 as a D.-C. voltage of one polarity and of a value determined by the extent of core movement.

When the core moves in the other direction from its neutral the A.-C. voltage at 13, 14 is out of phase with the plate voltage of triode 28 and results in a decrease in voltage $E_1$. The difference in voltages $E_2$—$E_1$ appears at 21, 22 as a D.-C. voltage of opposite polarity and of a value determined by the extent of core movement from neutral.

Thus the inverter 20 receives an A.-C. voltage from 18, 19 whose phase is determined by the direction of movement of core 7 from an electrical neutral position and whose magnitude is determined by the extent of core movement. It is phase discriminatory and produces at 21, 22 an amplified D.-C. voltage of polarity determined by phase of the A.-C. voltage and of a value varying relative to a reference value in accordance with magnitude of the A.-C. voltage. The output at 21, 22, while of amplified voltage is at too low a current value to feed directly to output terminals 24, 25. It is necessary then to introduce between 21, 22 and 24, 25 a power booster 23 which is a grid-controlled full-wave rectifier producing at 24, 25 full-wave pulsating D.-C. further smoothed out by filter 26, 27 and of constant polarity.

With zero voltage at 21, 22 the booster 23 normally conducts to an extent producing a power output at 24, 25 of a magnitude determined by the adjustments and components of the circuit. In this embodiment I desire the output, under this condition, to be about 50% of maximum desired thus allowing substantially equal regulation in either direction. The range of regulation may be controlled as to extent and equality above and below 50% by adjusting or limiting travel of core 7. The magnitude of the maximum in the range of power output at 24, 25 may be controlled by the position of 18 and other fixed or adjustable components of the circuit.

While the D.-C. voltage across 21, 22 is always increasing in magnitude from zero, for opposite movements of core 7 from its neutral position, it may be of one or the other polarity, thus determining the direction of change (increase or decrease) in magnitude of the power output across 24, 25 from 50% or some other chosen value.

In the description so far I have indicated a 50% power output at 24, 25 when core 7 is in its electrical neutral position and with zero voltage across 13, 14, thus providing full regulation across 50% power output in consonance with core movement.

By biasing $E_2$ relative to $E_1$, through adjustment 32, I may shift the power output at 24, 25 to some other value than 50% for a condition of zero voltage across 13, 14 and may vary the extent of regulation above or below such chosen value.

One example of use for my improved circuit of Fig. 1 is in the speed control of a pulverizer feeder motor from the relation of differential air pressures at the pulverizer mill. The controller 1 may be sensitive to such pressures in a manner similar to that disclosed in the patent to Dickey 2,439,721 but herein positioning the core 7 of a movable element transformer. Where the Dickey patent discloses a control of a variable speed device (4) between his constant speed motor (5) and feeder (3), I herein may utilize the power output across 24, 25 directly in the speed control of an adjustable speed feeder motor. Such a motor might have one of the present day commercial speed regulating arrangements such, for example, as the Thy-Mo-Trol of Patent 2,312,117.

I have shown in Fig. 1 (enclosed by dotted line) a block representing the circuit of the Moyer et al. Patent 2,312,117 with those elements in detail to which I would attach the D.-C. output terminals 24, 25. The only other change necessary would be to remove or disconnect the rheostat arm (18a) to provide armature control of the motor (10). In some cases armature control alone is desired and in that event the field control of the patent would not be used. If I desired to provide the possibility of selective manual-automatic speed control of the motor the necessary selector station would be connected between the terminals 24, 25 and the dotted block and rheostat (18) would be used for manual control.

Figure 2:
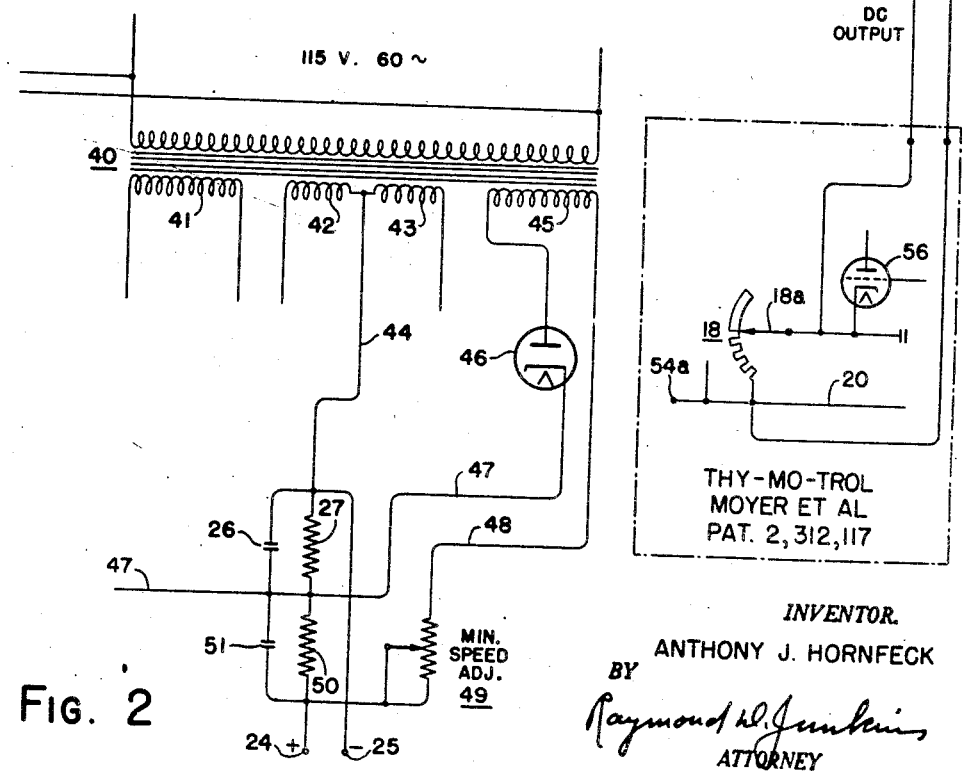
Fig. 2 illustrates a circuit arrangement which may be added to that of Fig. 1 to form a further embodiment.

The Thy-Mo-Trol circuit may have a feedback characteristic and in Fig. 2 I show a modification of Fig. 1 particularly adapted to the Thy-Mo-Trol. In both figures the transformer 40 has a secondary 41 for the inverter 20 and a center tap secondary 42, 43 for the booster 23, the center tap 44 joining the resistor 27 of the filter 26, 27. In Fig. 2 a further transformer secondary 45 supplies a half-wave rectifier 46 connected to a conductor 47 which joins the lower end of the resistor 27 and condenser 26. The secondary 45 has a second conductor 48 joining output terminal 24. Interposed between resistor 27 and terminal 24 is a resistor 50 spanned by a condenser 51, the elements 50, 51 comprising a bias to the D.-C. output at 24, 25 sufficiently high to obviate any effect of feed-back from the Thy-Mo-Trol. The bias need be only a small value and thus the half-wave rectifier 46 will suffice. If necessary this could be a full-wave rectifier. Inserted in conductor 48 is a minimum speed adjustment 49.

The operation, in general, is as follows. Assuming, by way of example, that diaphragms 3 and 4 are sensitive to fluid pressure differentials in connection with a coal pulverizer and that it is desired that a predetermined ratio of such differentials be maintained for all operating rates (within limits) of the pulverizer. The output of my circuit at 24, 25 controls the feeder motor for supplying raw coal to the pulverizer and the circuit is so adjusted that when the desired pressure differential relation exists the feeder motor will be operating at some normal rate supplying coal at say 50% of maximum possible. Departure of pressure differential ratio in one direction or the other will result in an increase or decrease in rate of supply of raw coal with consequent change in pressure differentials in proper direction to correct the departure and return the relation to desired value.

When desired relation exists the core 7 is in its electrical mid-position between secondary windings 9 and 10 and zero A.-C. voltage exists across terminals 13, 14. As a result of basic circuit component values and adjustments 18, 32 and 49 the D.-C. output at 24, 25 will cause the controlled motor to operate at say 50% of maximum speed. Movement of core 7 up or down (on the drawing) results in an increase or decrease in power output at 24, 25 from the 50% value.

The system is of a "floating" nature in which there is no electrical tie-back and the core position can change only through change in relation of pressure differentials acting upon diaphragms 3 and 4.

It will be appreciated that my improved circut may find usefulness in many systems and the system I have described as an example is not to be considered as limiting.

What I claim as new, and desire to secure by Letters Patent of the United States, is:

1. A system for providing a direct current control voltage representative in magnitude of the value of a variable, comprising, means responsive to said variable for establishing an A.-C. signal of reversible phase from a norm and changeable magnitude representative of the instantaneous value of said variable, a phase discriminating amplifier and inverter adapted to convert said signal to an amplified direct current of reversing polarity and changeable magnitude, a full wave rectifier including thermionic devices each having a grid, an anode and a cathode, an A.-C. supply for the anode-cathode circuits of said devices, circuit components normally providing a part capacity output from said rectifier when the grids of the devices are at zero control potential, and means connecting the output of said phase discriminating amplifier and inverter to energize the grids of said rectifier to regulate its output in each direction from said part capacity whereby to provide a D.-C. output of fixed polarity and regulated in magnitude in accordance with changes in said variable.

2. The system as defined in claim 1 in which a diode rectifier is energized from said source of alternating current and means to combine the fixed output thereof with said D.-C. output of regulated magnitude.

3. Apparatus for providing a direct current changeable in magnitude in accordance with the change in a variable comprising in combination, a variable-actuated transducer producing an A.-C. signal of reversible phase and magnitude representative of the instantaneous value of the variable, a pair of thermionic tubes each having an anode and a cathode, a source of alternating current energizing the anode-cathode circuits of said tubes in parallel, an impedance in each of said circuits, a grid for one of said tubes, means associating said grid with the signal to control the potential across the said impedance of its tube, means to adjust the potential across the other impedance to a desired extent of that of the first when the control potential on said grid is zero, a circuit combining said potentials in opposition, a pair of grid-controlled rectifiers connected to a source of alternating current for full-wave rectification, circuit components providing for intermediate capacity rectifier output at zero grid control voltage therefor, and means placing said potential combining circuit in control of said rectifier grids whereby their output is varied in magnitude only in both directions from said intermediate capacity.

4. The apparatus as defined in claim 3 in which the transducer comprises a pressure actuated member, a core movable by said member, an A.-C. energized primary cooperating with said core, a pair of spaced secondaries cooperating therewith, and means connecting said secondaries to provide an output signal of one phase when the core moves in one direction from neutral and of the other phase when movement is opposite, the respective potentials being indicative of the magnitude of departure of the core from neutral.

5. The apparatus as defined in claim 3 in which the rectifier output is delivered across an impedance and a condenser constituting a load and filter.

6. The apparatus as defined in claim 3 in which a diode rectifier is energized from said alternating current to provide a fixed output, and means to combine said fixed output with the variable output of said full-wave rectifier.

7. The apparatus as claimed in claim 6 in which means is provided to manually adjust the potential of said fixed output.

8. Apparatus for providing a direct current changeable in magnitude in accordance with the change in a variable comprising in combination, a variable-actuated transducer producing an A.-C. signal of reversible phase and variable magnitude representative of the instantaneous value of the variable, a thermionic tube having an anode, a cathode and a grid, an impedance, a source of alternating current energizing a circuit comprising said anode, cathode and impedance, means associating said grid with the signal to control the potential across said impedance, a source of potential connected in opposition to that in said impedance, means to adjust said potential from said source to a desired extent of that in the impedance when the said signal is zero, a grid-controlled rectifier tube having its anode-cathode circuit connected to a source of alternating current, circuit components limiting rectifier output to an optimum value at zero control voltage for the grid, and means placing the difference in said potentials in control of said rectifier whereby the rectifier output may be adjusted above and below said optimum to represent changes in said variable.

9. The apparatus of claim 8 in which circuit components regulate the output of said thermionic tube to an optimum value at zero signal whereby it may be regulated up or down by change in signal phase.

10. In a pulverizer control, in combination, means actuated by pressure, a lever movable in accordance with a comparison of said means, a core movable by said lever from a midposition, an A.-C. energized primary winding cooperating with said core, a pair of opposed secondaries in equal inductive relation to said core only when the latter is in midposition whereby an A.-C. signal is generated therein dependent in phase on the direction of departure of the core from midposition and in magnitude on the amount of said departure, an A.-C. energized triode having a load impedance, means associating the grid of said triode and said signal to vary the potential across said impedance as the signal varies in phase and amplitude, a rectifier tube energized in parallel to said triode and having a load impedance, means to adjust the potential across said rectifier impedance means to combine the said potentials in opposition to provide a D.-C. signal of reversible polarity, a grid-controlled rectifier, a source of alternating current therefor, means associating said D.-C. signal with the grid thereof, and an output circuit including a filter whereby the last mentioned rectifier delivers a D.-C. potential variable in amplitude only in accordance with the variations in said first signal.

11. The control as defined in claim 10 in which the second rectifier is adjusted by circuit components to deliver about one-half its available power at zero D.-C. signal whereby the output is reduced or augmented in accordance with the polarity of the D.-C. signal.

12. The control as defined in claim 11 in which the second rectifier is a dual-tube full-wave type with both grids associated with the D.-C. signal.

13. The control as defined in claim 10 in which the output of said second rectifier is superposed on the fixed and filtered output of an additional rectifier.

14. The system of claim 10 in which all A.-C. energized devices are supplied from the same source to provide proper phasing.

15. A motor control system comprising in combination a motor; a speed regulator for said motor adapted to be actuated by a direct current of varying potential; a power rectifier of the grid control type having an A.-C. supply and a filter connected to said regulator and arranged to provide the median of said varying potential at zero grid control voltage to actuate said regulator; means to supply a grid control voltage for said rectifier of reversible polarity comprising a phase sensitive amplifier and companion rectifier, an output impedance for each, an A.-C. source energizing said amplifier and rectifier in parallel, means combining the potentials across said impedances in opposition to control the first rectifier grid, means to adjust said second rectifier impedance to substantially balance said potentials at zero amplifier grid control potential; said amplifier having circuit constants providing a median output at zero grid control voltage; and a source of variable amplitude, reversible phase alternating current associated with the grid of said amplifier to adjust its impedance potential above and below that of the rectifier impedance.

16. The motor control system of claim 15 in which said reversible phase alternating current for the amplifier grid is regulated in phase and amplitude by the position of a magnetic core representative of the value of a variable, an A.-C. energized primary inductively related to said core and a pair of like secondaries spaced along the path of said core and inductively related thereto, and means to combine the outputs of said secondaries in opposition for application to the amplifier grid.

17. The system as defined in claim 15 in which the power rectifier is of the full-wave type, a second power rectifier adjusted to have a constant output, a filter for the second power rectifier, and a circuit combining the outputs of the constant and variable power rectifiers.

18. The system of claim 17 in which means is provided to adjust the constant output of said second power rectifier.

19. A system for providing a direct current control voltage representative in magnitude of the value of a variable, comprising, means responsive to said variable for establishing an A.-C. signal of reversible phase from a norm and changeable of reversible phase from a norm and changeable magnitude representative of the instantaneous value of said variable, a phase discriminating amplifier and inverter including means to convert said signal to an amplified direct current of reversing polarity and changeable magnitude, a rectifier including a thermionic device having a grid, an anode and a cathode, an A.-C. supply for the anode-cathode circuit of said device, circuit components normally providing a part capacity output from said rectifier when the grid of the device is a zero control potential, and means connecting the output of said phase discriminating amplifier and inverter to energize the grid of said rectifier to regulate its output in each direction from said part capacity whereby to provide a D.-C. output of fixed polarity and regulated in magnitude in accordance with changes in said variable.

20. Apparatus for providing a direct current changeable in magnitude in accordance with the change in a variable comprising in combination, a variable-actuated transducer producing an A.-C. signal of reversible phase and magnitude representative of the instantaneous value of the variable, a pair of thermionic tubes each having an anode and a cathode, a source of alternating current energizing the anode-cathode circuits of said tubes in parallel, an impedance in each of said circuits, a grid for one of said tubes, means associating said grid with the signal to control the potential across the said impedance of its tube, means to adjust the potential across the other impedance to a desired extent of that of the first when the control potential on said grid is zero, a circuit combining said potentials in opposition, a grid-controlled rectifier connected to a source of alternating current for rectification, circuit components providing for intermediate capacity rectifier output at zero grid control voltage therefor, and means placing said potential combining circuit in control of said rectifier grid whereby its output is varied in magnitude only in both directions from said intermediate capacity.

21. In a pulverizer control, in combination, means actuated by pressure, a lever movable in accordance with a comparison of said means, a core movable by said lever from a mid-position, an A.-C. energized primary winding cooperating with said core, a pair of opposed secondaries in equal inductive relation to said core only when the latter is centered whereby an A.-C. signal is generated therein dependent in phase on the direction of departure of the core from midposition and in magnitude on the amount of said departure, an A.-C. energized triode having a load impedance, means associating the grid of said triode and said signal to vary the potential across said impedance as the signal varies in phase and amplitude, a second load impedance, means to adjustably regulate the potential across said second impedance, means to combine the said potentials in opposition to provide a D.-C. signal of reversing polarity, a grid-controlled rectifier, a source of alternating current therefor, means associating said D.-C. signal with the grid thereof, an output circuit including a filter whereby the last mentioned rectifier delivers a D.-C. potential variable in amplitude only in accordance with the variations in said first signal, a motor, and a control for the speed of said motor responsive to said last mentioned D.-C. potential.

ANTHONY J. HORNFECK.

REFERENCES CITED

The following references are of record in the file of this patent:

UNITED STATES PATENTS

| Number | Name | Date |
|---|---|---|
| 2,216,301 | Sparrow | Oct. 1, 1940 |
| 2,270,732 | Jones | Jan. 20, 1942 |
| 2,276,506 | Moore | Mar. 17, 1942 |
| 2,363,473 | Ryder | Nov. 21, 1944 |
| 2,413,120 | Swanson | Dec. 24, 1946 |
| 2,465,191 | Borden et al. | Mar. 22, 1949 |